US 6,668,794 B2

(12) United States Patent
Nagano et al.

(10) Patent No.: US 6,668,794 B2
(45) Date of Patent: Dec. 30, 2003

(54) FUEL INJECTION DEVICE FOR INTERNAL COMBUSTION ENGINE

(75) Inventors: Masami Nagano, Hitachinaka (JP); Tadashi Someno, Hitachinaka (JP); Masahiro Toyohara, Hitachiohta (JP)

(73) Assignees: Hitachi, Ltd., Tokyo (JP); Hitachi Car Engineering Co., Ltd., Ibaraki (JP)

( * ) Notice: Subject to any disclaimer, the term of this patent is extended or adjusted under 35 U.S.C. 154(b) by 39 days.

(21) Appl. No.: 09/960,490

(22) Filed: Sep. 24, 2001

(65) Prior Publication Data
US 2002/0083925 A1 Jul. 4, 2002

(30) Foreign Application Priority Data
Dec. 28, 2000 (JP) ................................ 2000-402675

(51) Int. Cl.$^7$ ................................ F02B 31/00
(52) U.S. Cl. ........................ 123/306; 123/301
(58) Field of Search ........................ 123/301, 306, 123/308, 339.24, 590, 432

(56) References Cited

U.S. PATENT DOCUMENTS

| 3,982,504 A | * | 9/1976 | Noguchi et al. ............ 123/260 |
| 4,271,795 A | * | 6/1981 | Nakagawa et al. ......... 123/308 |
| 4,714,063 A | * | 12/1987 | Oda et al. .................... 123/308 |
| 5,640,941 A | * | 6/1997 | Hazen et al. ............... 123/306 |
| 6,318,336 B1 | * | 11/2001 | Mueller ....................... 123/306 |

FOREIGN PATENT DOCUMENTS

| JP | 06-159203 | 6/1994 |
| JP | 11-013585 | 1/1999 |
| JP | 11-159424 | 6/1999 |

* cited by examiner

Primary Examiner—Mahmoud Gimie
(74) Attorney, Agent, or Firm—Dickstein Shapiro Morin & Oshinsky LLP

(57) ABSTRACT

The present invention provides a fuel injection device comprising an intake pipe having interior wall surfaces for providing air from an upstream side to a downstream side and a fuel injection port disposed in the intake pipe between the surfaces for providing fuel into the intake pipe and an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage.

12 Claims, 8 Drawing Sheets

FUEL IN(FOUR PIECES)

FUEL INJECTION DEVICE FOR INTERNAL COMBUSTION ENGINE

FIELD OF THE INVENTION

The present invention relates to a fuel injection device for an internal combustion engine, and particularly to a fuel injection device for an internal combustion engine in which a fuel injected from a fuel injection port is prevented from adhering to the interior wall surface of an intake pipe.

DISCUSSION OF THE RELATED ART

Recently, environmental issues concerning automobiles have been given much attention. Therefore, to improve exhaust gas performance and fuel consumption of internal combustion engines, a variety of internal combustion engines such as lean burn engines and direct injection engines have been proposed.

The direct injection engine is an internal combustion engine that injects fuel directly into a combustion chamber. However, the direct injection engine is disadvantageous in that the piston head needs to be in a special shape, and peripheral devices are required for direct injection of fuel. Further, many modifications must be made to an existing base engine, leading to a higher production cost for the internal combustion engine.

Accordingly, development of a lean burn engine having a multipoint injection system (MPI system) comprising a fuel injection valve in the vicinity of an intake port of each cylinder of the internal combustion engine has been proposed. The lean burn engine is an internal combustion engine in which a gas mixture made lean is brought into combustion. In the lean burn engine, fuel injection is carried out synchronously with the intake stroke, thereby achieving a leaner mixture gas while collecting an ignitable rich gas mixture only around an ignition plug, whereby it is possible to realize improvements in fuel consumption and exhaust gas performance of the internal combustion engine. Further, in order to realize improvements in the fuel consumption and exhaust gas performance of the internal combustion engine, it is necessary that the particle size of the fuel droplets injected by a fuel injection device not be greater than about 70 $\mu$m.

Conventionally, for realizing improvements in the combustion of a lean burn internal combustion engine comprising the above-mentioned MPI system, various proposals have been made. For instance, reducing the particle size of the injected fuel by providing a multiplicity of holes at the injection port portion of the fuel injection device or injecting the fuel at a central portion of an intake port by forwardly projecting the injection port portion (formation of long nozzle). But the reduction of the particle size of the injected fuel has the drawback that the smaller particulates of the injected fuel have smaller mass as compared with injected fuel of ordinary particle size, and are more susceptible to influence of air flow, so that the flow of the injected fuel is directed and adheres to the interior wall surface of the intake pipe.

As shown in FIGS. 16, 17, the spray of fuel injected from a fuel injection valve 1 into the air flow in the intake pipe 18 is largely deflected in the air flow direction, resulting in the fuel adhering to the interior wall surface 18a of the intake pipe 18. The quantity of the fuel adhered depends on the temperature of the intake pipe 18, particle size of the fuel droplets, flow rate of air and the like. In FIG. 16, an air control valve 40 and a throttle valve shaft 41 is provided to regulate the flow of air in the main air passage. But, as this prior art still has the drawback of fuel particles adhering to the interior wall surface 18a.

Also, as shown in FIG. 18, the particle size of the spray of the fuel injection valve 1 is reduced, and the spray point is disposed nearer to the intake valve (nozzle is elongated) for the purpose of preventing the adhesion of fuel particles to the wall surface. But, in the case of FIG. 18, the fuel particles adhere to the interior wall surface 18a of the intake pipe.

SUMMARY OF THE INVENTION

The present invention provides a fuel injection device for an internal combustion engine which resolves the problem of adhesion of fuel particles to the internal wall surface of the intake pipe, in order to improve the quality of gas mixture in a cylinder.

In an object of the invention a fuel injection device is provided comprising an intake pipe having interior wall surfaces for providing air from an upstream side to a downstream side and a fuel injection port disposed in the intake pipe between the surfaces for providing fuel into the intake pipe. Further, the invention provides an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage.

In another object of the invention an engine is provided comprising an engine control unit and a fuel injection device electrically coupled to the engine control unit for regulating fuel injection, the device comprising an intake pipe having interior wall surfaces for providing air from an upstream side to a downstream side and a fuel injection port disposed in the intake pipe between the surfaces for providing fuel into the intake pipe. The invention further provides an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage.

In yet another object of the present invention a fuel injection device is provided comprising an intake pipe having interior wall surfaces for providing air from an upstream side to a downstream side and a fuel injection port disposed in the intake pipe between the surfaces for providing fuel into the intake pipe. The invention further provides an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage wherein the air flow layer passage on the upstream side has a greater cross sectional area than the air flow layer passage on the downstream side.

In another object of the present invention an engine is provided comprising an engine control unit and a fuel injection device electrically coupled to the engine control unit for regulating fuel injection, the device comprising an intake pipe having interior wall surfaces for providing air from an upstream side to a downstream side and a fuel injection port disposed in the intake pipe between the surfaces for providing fuel into the intake pipe. The invention further provides an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage wherein the air flow layer passage on the upstream side has a greater cross sectional area than the air flow layer passage on the downstream side.

In yet another object of the present invention an intake pipe having interior wall surfaces for providing air is provided comprising an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage for guiding an injected fuel away from the surfaces.

In another object of the present invention an engine is provided comprising an engine control unit and an air intake control unit coupled to the engine control unit for regulating air intake, the air intake control unit being coupled to an intake pipe having interior wall surfaces for providing air. The intake pipe comprises an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage for guiding an injected fuel away from the surfaces.

BRIEF DESCRIPTION OF THE DRAWINGS

The above advantages and features of the invention will be more clearly understood from the following detailed description which is provided in connection with the accompanying drawings.

DETAILED DESCRIPTION OF THE INVENTION

Figure 1:
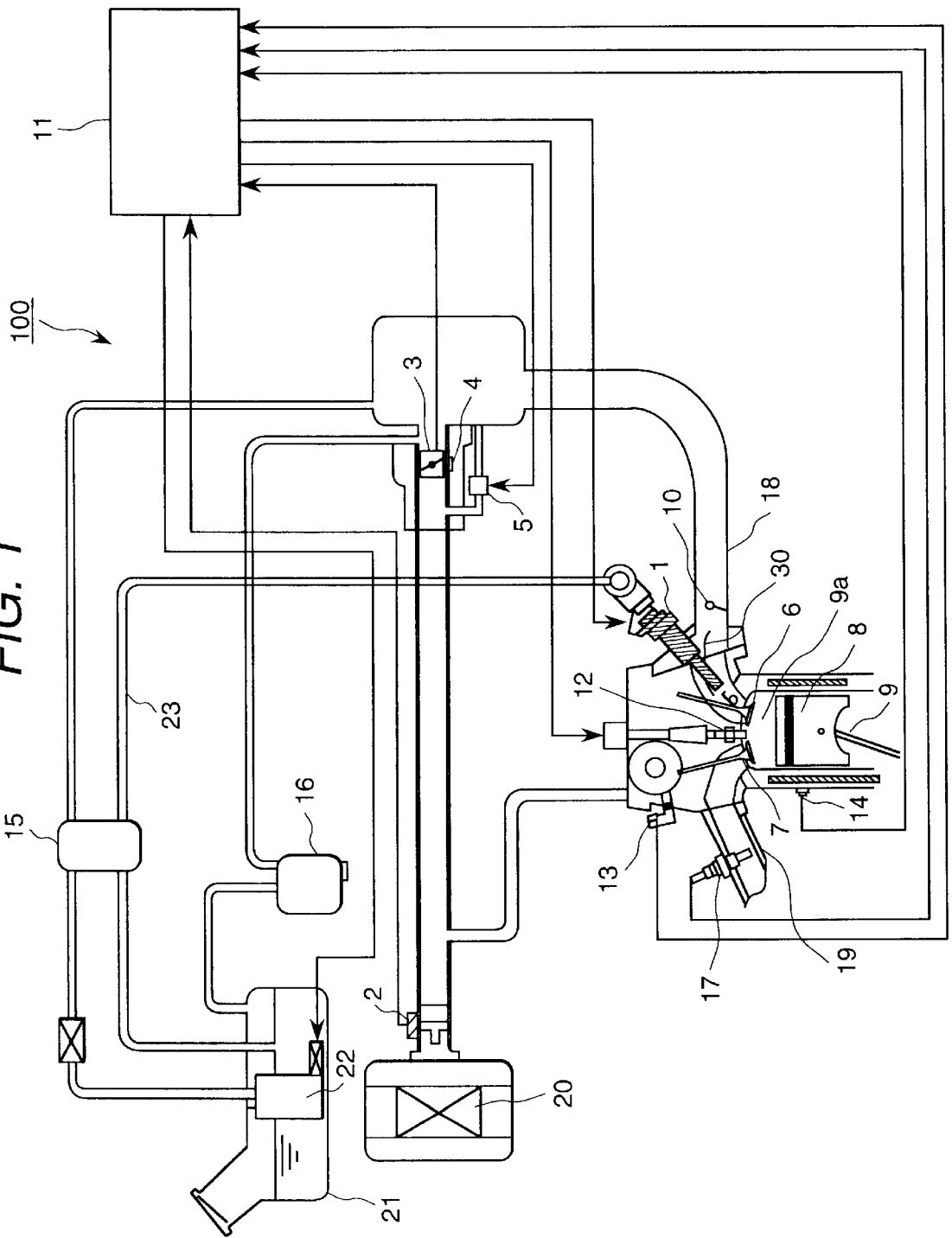
FIG. 1 is a diagram illustrating an internal combustion engine system comprising the fuel injection device for internal combustion engine according to an embodiment of the present invention.

Exemplary embodiment of the present invention will be described below in connection with the drawings. Other embodiments may be utilized and structural or logical changes may be made without departing from the spirit or scope of the present invention. Like items are referred to by like reference numerals throughout the drawings.

Referring now to FIG. 1, an internal combustion engine 100 utilizing the fuel injection device of the present invention is described, comprising, for example, four cylinders 9, 9 . . . (note, only one cylinder is shown) and a multipoint injection system (MPI system) comprising fuel injection valves 1, 1 . . . in the vicinity of intake ports of the cylinders 9, 9. . . . Each multi-valve type cylinder 9 of the internal combustion engine 100 is provided with an ignition plug 12 and comprises an intake valve 6, an exhaust valve 7 and a piston 8 reciprocated in the cylinder 9, with a combustion chamber 9a provided in the cylinder 9. Each of the cylinders 9, 9 . . . is provided with an intake pipe 18 and an exhaust pipe 19 which are disposed adjacent to each other and opened and closed respectively by the intake valve 6 and the exhaust valve 7. The intake pipe 18 is provided as a branched intake pipe having two intake ports.

The intake pipe 18 comprises an air cleaner 20 at its intake end, and is provided with a throttle valve 3 at an appropriate position. In addition, the intake pipe 18 is provided, as one of operating condition detecting means, with an air flow sensor 2 for measuring the mass flow rate of intake air, and a throttle sensor 4 for measuring the opening of the throttle valve 3.

Further, a cooling water temperature sensor 14 for measuring the temperature of cooling water for the internal combustion engine 100 and a crank angle sensor 13 for measuring the engine speed are provided.

Air flowing in from the air cleaner 20 disposed at an upstream portion of the intake pipe 18 is controlled with respect to flow rate by the throttle valve 3, and is then mixed with gasoline injected at a predetermined angle from the fuel injection valve (injector) 1 being the fuel injection device, and the resultant mixture is supplied to each of the cylinders 9, 9 . . . .

Exhaust gas formed upon combustion in the cylinders 9, 9 . . . is directed through the exhaust pipe 19 to a catalytic converter (not shown), where it is purified before being discharged. In the exhaust pipe 19, an air-to-fuel ratio sensor 17 for outputting a wide-range linear air-to-fuel ratio signal in proportion to oxygen concentration in the exhaust gas is provided.

Also, the fuel from a fuel tank 21 is drawn and pressurized by a fuel pump 22, and is led to a fuel inlet of the injector 1 through a fuel pipe 23 provided with a pressure regulator 15, and surplus fuel is returned into the fuel tank 21. Incidentally, the fuel evaporated from the fuel tank 21 is restrained from being discharged to the atmosphere and is directed to the intake pipe 18 by a canister 16.

An output signal indicative of intake air quantity obtained from the air flow sensor 2, an output signal from the throttle sensor 4, and output signals from the cooling water temperature sensor 14, the crank angle sensor 13, the air-to-fuel ratio sensor 17 and the like are inputted to an engine controller (control unit C/U) 11. The control unit 11 is disposed on a vehicle body of the vehicle or in an engine room, and performs predetermined arithmetic operations based on electrical signals indicative of the operating conditions of the internal combustion engine 100 outputted from the various sensors. In order to perform an optimum control based on the operating conditions, the control unit 11 outputs a signal for opening and closing of the injector 1 for supplying and injecting the fuel, a signal for driving the ignition plug 12, and a signal for opening and closing an idle speed control valve (ISC) 5 for controlling the engine speed at idling time so as to bring it to a target revolution number, and controls the fuel pump 22 and a swirl control valve driving means 10. The control unit 11 controls fuel injection for each cylinder 9 by matching the fuel injection timings with intake strokes of the cylinders 9, 9 . . . .

The control unit 11 is composed of an I/O as an input/output interface, an arithmetic processing unit MPU, a RAM and a ROM storing a multiplicity of control programs, a timer counter, etc. More specifically, the control unit 11 comprises a fuel injection quantity setting means and a fuel injection timing setting means. The fuel injection quantity setting means computes a required fuel quantity to be supplied from the injector 1 into the cylinder 9 based on a detected intake air quantity and a set air-to-fuel ratio, and computes a required injection pulse width (opening time of the injector 1) based on a flow rate inclination and an invalid injection pulse width which are injection quantity characteristics of the injector 1. Based on the required injection pulse width, the injector 1 is opened for the time period of the injection pulse.

Also, the fuel injection timing setting means computes an injection timing for the injector 1 based on the intake air quantity, the engine speed and the like, synchronizes the injection timing with the intake stroke of the internal combustion engine 100, and sets the fuel injection timing in the intake stroke to an optimum timing. Based on the timing thus obtained, the fuel is injected from the injector 1, and ignition of the ignition plug 12 and the like are performed. Further, depending on the performance of the internal combustion engine 100, the injection in the intake stroke or the injection in the exhaust stroke may be selected according to the cooling water temperature, whereby optimum fuel injection is performed.

Figure 2:
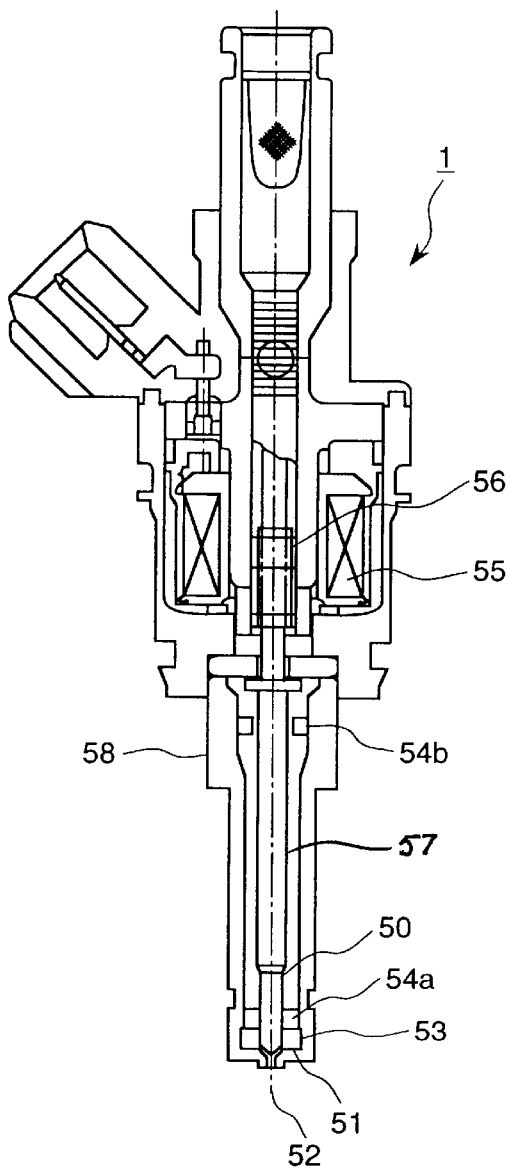
FIG. 2 is a vertical sectional view of an injector in the fuel injection device of FIG. 1.

FIG. 2 is a sectional view of the injector 1 according to the present invention. The injector 1 is formed as a electromagnetic injection valve, and comprises a valve body 50, a swirler (fuel swirling element) 53 which is a fuel particle size reducing means, a solenoid coil 55, a valve-closing energizing spring 56, a plunger rod 57, a valve main body 58, comprising a valve seat surface 51 and an injection port 52, etc. When a pulse is applied to the solenoid coil 55 based on a driving signal from the control unit 11, the plunger rod 57 is attracted to move between valve body guide portions 54*a*, 54*b*, and the valve body 50 which is integrated with the plunger rod 57 is separated from the valve seat surface 51 to open the injection port 52. But, when the pulse application is stopped, the plunger rod 57 is moved by an urging force of the valve-closing energizing spring 56, and the valve body 50 comes into contact with the valve seat surface 51 to close the injection port 52.

Figure 3:
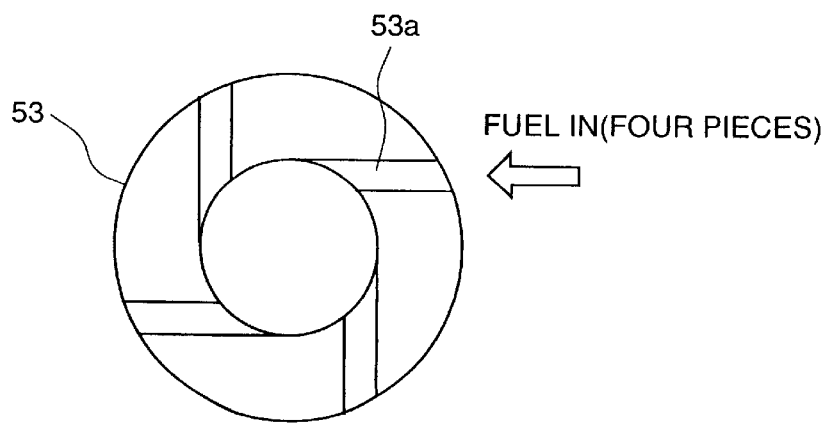
FIG. 3 illustrates the shape of a swirler of the injector of FIG. 2.

As shown in FIG. 3, the swirler 53 is provided on its lower surface with four fuel swirling grooves 53*a* directed toward the valve body 50, wherein the opposed fuel swirling grooves 53*a* are not disposed on the same straight line and are inclined toward the valve body 50. The fuel in the injector 1 having passed through the gap between the swirler 53 and the valve main body 58 is swirled through the fuel swirling grooves 53*a* toward the injection port 52, and injected toward the cylinder 9 while being atomized in two directions, whereby fuel particle size reduction (atomizing) is performed from the beginning of opening of the valve body 50.

Figure 4:
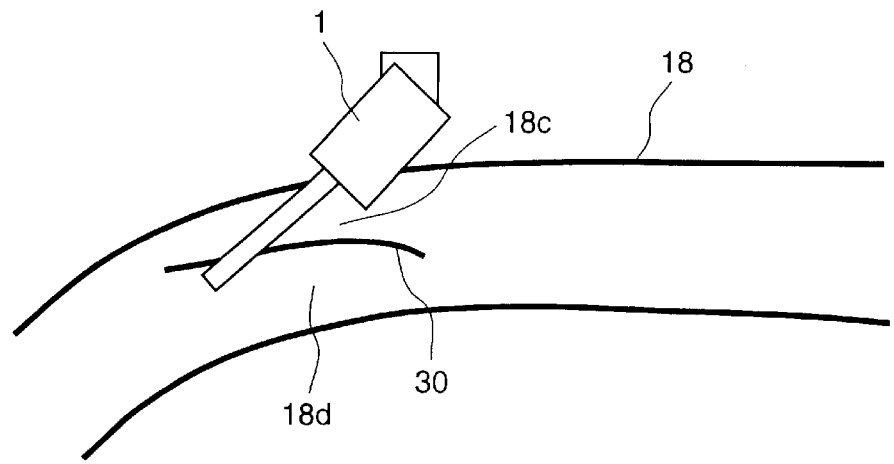
FIG. 4 illustrates an example of the fuel injection device of FIG. 1.

FIG. 4 illustrates an example of the fuel injection device for an internal combustion engine according to the present invention. An injector 1 shown in FIG. 4 has the same shape as that of FIG. 18, and the fuel injection device comprises, inside of an intake pipe 18, a plate like shaped air guide member (air flow layer producing means) 30 as shown in FIG. 4 in a range from the upstream side to the downstream side of the injector 1. In other words, the air guide member disposed in the intake pipe 18 is in a plane substantially parallel with the interior wall surfaces of the intake pipe. The air guide member 30 divides the interior of the intake pipe 18 into a lower portion (main passage) 18*d* and an upper portion (sub passage) 18*c*, the upper portion (sub passage, or air flow layer producing passage) 18*c* having a larger passage sectional area on the upstream side than on the downstream side. With the passage sectional area decreasing downstream, air flow rate is increased. With the air guide member 30 provided in the intake pipe 18, an accelerated air layer is present between the injected fuel and the interior wall surface of the intake pipe 18, whereby the fuel injected from the injector 1 is prevented from adhering to the interior wall surface of the intake pipe 18 by the accelerated air.

Hence, the present invention provides a fuel injection device comprising an intake pipe having interior wall surfaces for providing air from an upstream side to a downstream side and a fuel injection port disposed in the intake pipe between the surfaces for providing fuel into the intake pipe. Further, the invention provides an air guide member disposed in the intake pipe in a plane substantially parallel to the surfaces for guiding air separately towards an air flow layer passage and a main air passage wherein the air guided towards the air flow layer passage has a speed at least greater than the air guided towards the main air passage.

Figure 5:
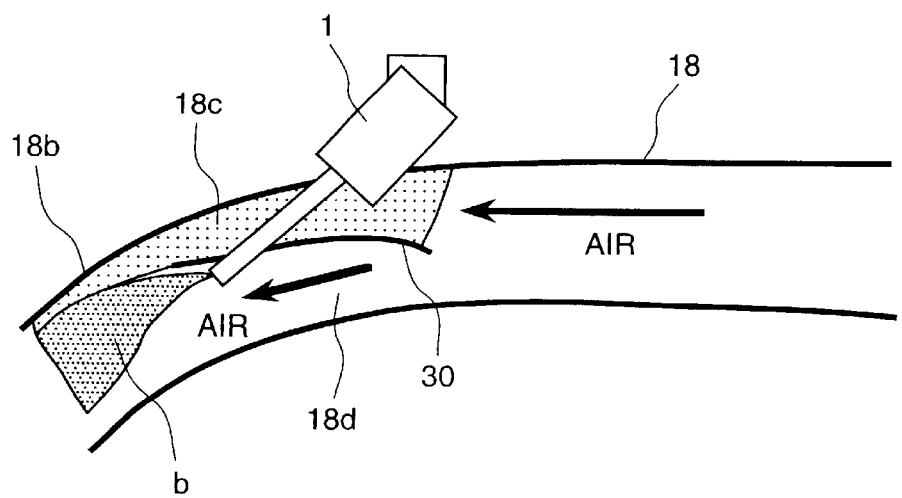
FIG. 5 illustrates the flow of fuel and air in the fuel injection device of FIG. 4.
Figure 18:
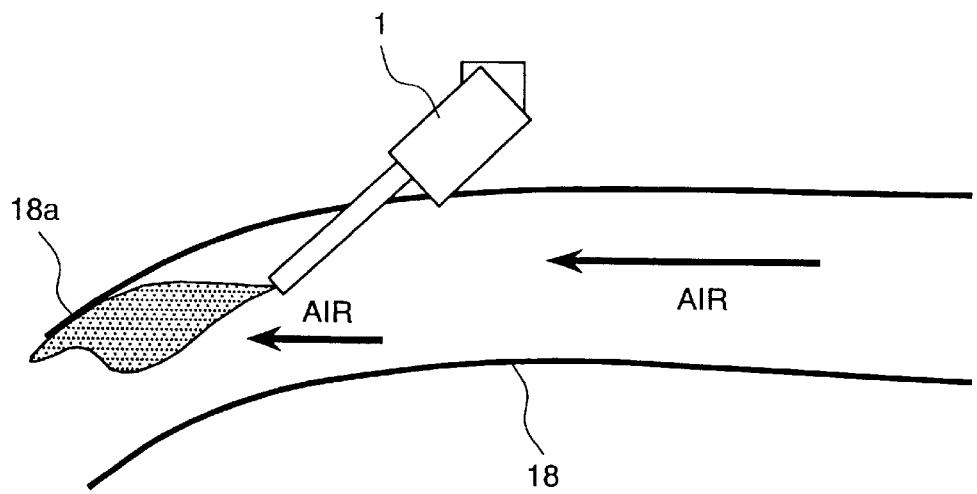
FIG. 18 illustrates the flow of air and fuel spray injected from the injector in another fuel injection device according to the prior art.

FIG. 5 shows the flow of air and the flow of spray of the fuel in the fuel injection device of the present invention. Since the accelerated air flow is present between the spray b from the injector 1 and the internal wall surface of the intake pipe 18, the fuel of the spray b does not adhere to the internal wall surface 18*b* of the intake pipe 18, unlike the case of the internal wall surface 18*a* according to the prior art as shown in FIG. 18.

Figure 6:
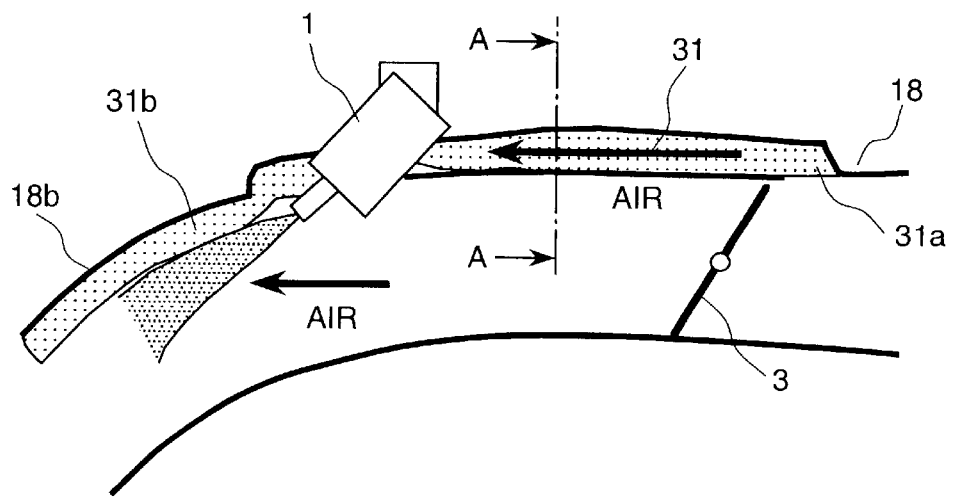
FIG. 6 illustrates another example of the fuel injection device of FIG. 1.

FIG. 6 shows another example of the fuel injection device for internal combustion engine according to the present invention. An air passage (air flow layer producing passage) 31 of a bypass pipe provided in an upper portion of the intake pipe 18 bypasses a throttle valve 3, and an inlet 31*a* thereof is located on the upstream side of the throttle valve 3, while an outlet 31*b* thereof is opened on the downstream side of the injector 1. Since the air flowing out of the outlet 31b is supplied between the fuel injected from the injector 1 and the internal wall surface of the intake pipe 18, the injected fuel is prevented from adhering to the interior wall surface 18b while flowing downstream by the layer of air flowing out of the outlet 31b.

Figure 7:
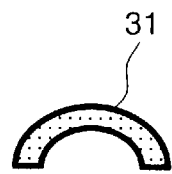
FIG. 7 is a sectional view taken along line A—A of the example of FIG. 6.

FIG. 7 shows a sectional view taken along line A—A of FIG. 6 of the air passage 31 of the bypass pipe. While the shape of the air passage 31 is an arc, the shape may be either circular or tetragonal. In other words, the shape can be determined appropriately in consideration of interference with the surrounding component parts, convenience in production of the intake pipe 18 or the like.

Figure 8:
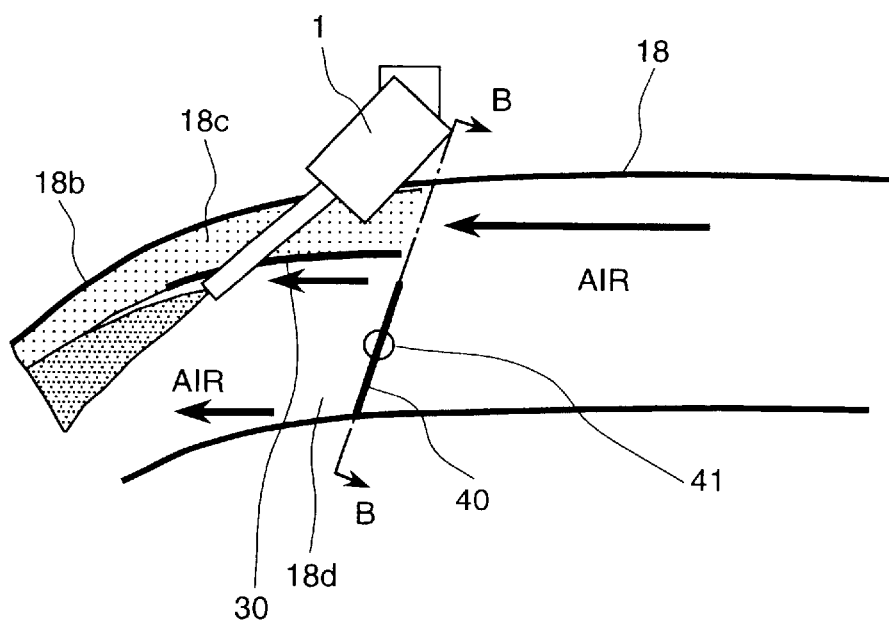
FIG. 8 illustrates another example of the fuel injection device of FIG. 1.
Figure 9:
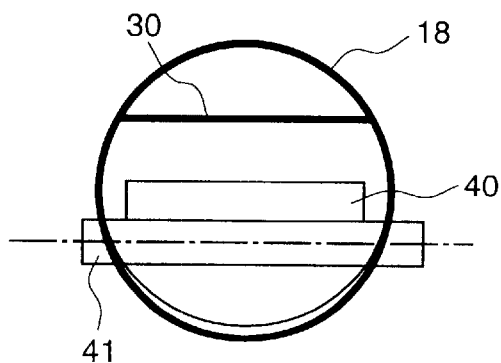
FIG. 9 is a sectional view taken along line B—B of the example of FIG. 8.

FIG. 8 shows another example of the fuel injection device for internal combustion engine according to the present invention. The fuel injection device comprises an air quantity control valve 40 on the side of the main passage 18d under the air guide member 30, in order to direct the air into the space between the fuel injected from the injector 1 and the internal wall surface 18b of the intake pipe 18. A throttle valve shaft 41 is controlledly driven to rotate by a driving means such as a motor based on a signal from the control unit 11, whereby the opening of the air quantity control valve 40 is regulated, and an optimum air quantity can be obtained. FIG. 9 is a sectional view taken along line B—B of FIG. 8, and shows an example of the shape of the air quantity control valve 40.

Figure 10:
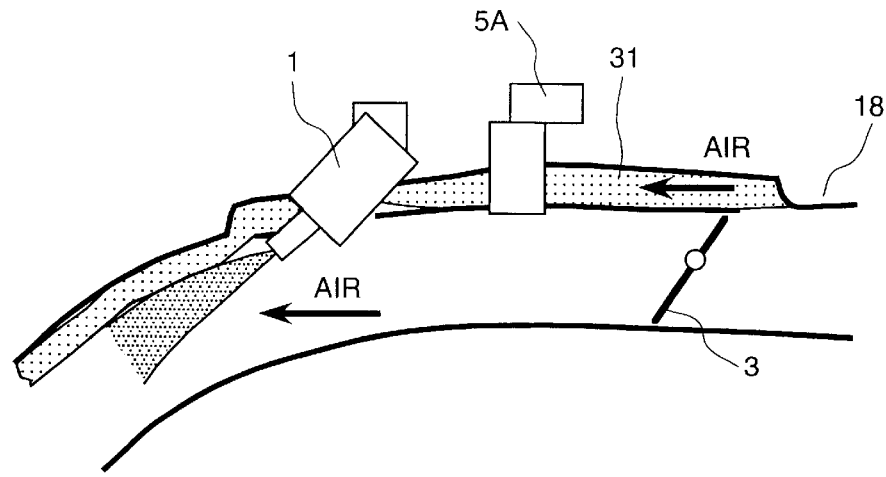
FIG. 10 illustrates another example of the fuel injection device of FIG. 1.

FIG. 10 shows another example of the fuel injection device for internal combustion engine according to the present invention. The fuel injection device comprises an air flow layer control valve 5A disposed in the air passage 31 formed at an upper portion of the intake pipe 18 of the example shown in FIG. 6. Idle speed control is also provided by the air passage 31. If the idle speed control valve 5A is provided in the air passage 31, the idle speed control valve 5 shown in FIG. 1 can be omitted.

Figure 11:
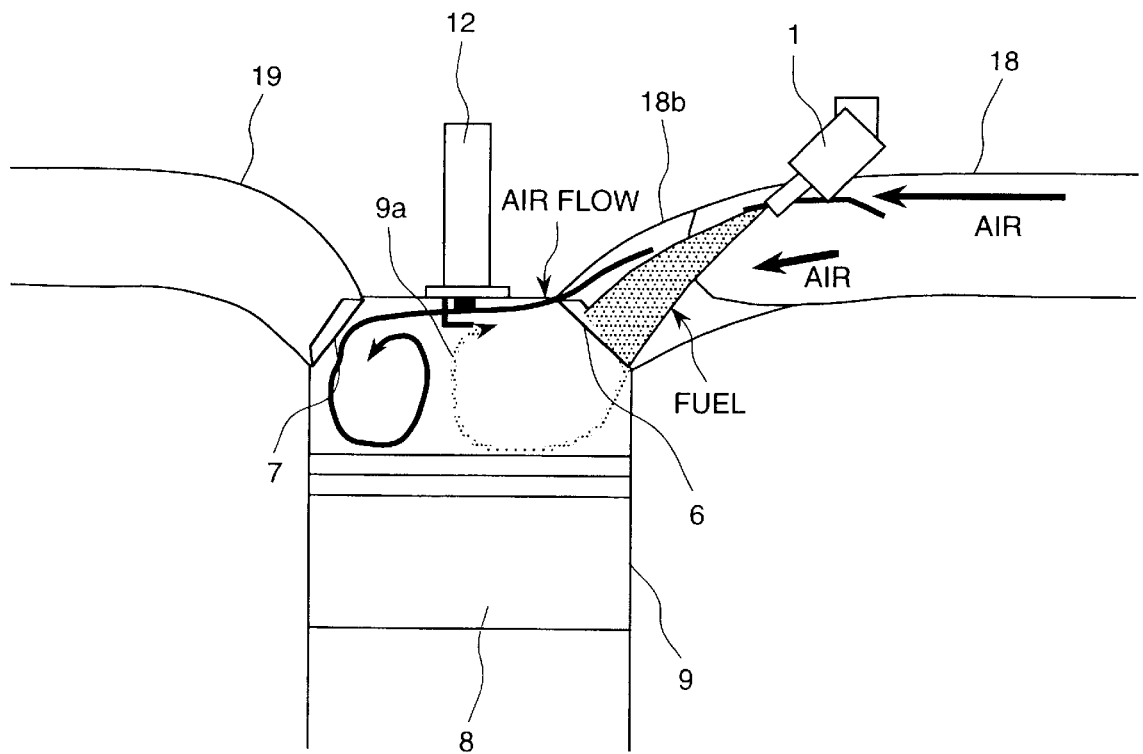
FIG. 11 illustrates the flow of the injected fuel and air in the combustion chamber of an internal combustion engine.

FIG. 11 illustrates the flow of the injected fuel and air in the combustion chamber of the internal combustion engine using the fuel injection device according to the present invention. As shown in FIG. 11, the fuel injection device of the present invention forms an air flow layer by positively passing air between the internal wall surface of the intake pipe 18 and the fuel injected from the injector 1, whereby the air flow layer and the injected fuel can be supplied into the combustion chamber 9a with it being separated from each other at the position of passing through the intake valve 6.

Since the air flow passes through an upper portion of the intake valve 6 to enter the combustion chamber 9a while the injected fuel passes through a lower portion of the intake valve 6 to enter the combustion chamber 9a, the air flow passes so as to form a swirl on the side of the exhaust valve 7. But, the injected fuel passes on the lower portion side of the intake valve 6 is directed to the side of the piston 8. In this case, since the air flow forms a swirl on the side of the exhaust valve 7, an air wall is formed by the swirl of the air on the side of the exhaust valve 7 in the combustion chamber 9a, so that the injected fuel flows upwards from a central portion of the combustion chamber 9a, as shown in FIG. 11, and, therefore, the injected fuel collects in the vicinity of the ignition plug 12.

This condition ensures that a rich mixture gas can be formed in the vicinity of the ignition plug 12. Therefore, ignitability at the ignition plug 12 is enhanced, and the function of a lean burn engine is achieved, so that improvements in the fuel consumption of the internal combustion engine and exhaust gas purifying performance can be achieved.

Figure 12:
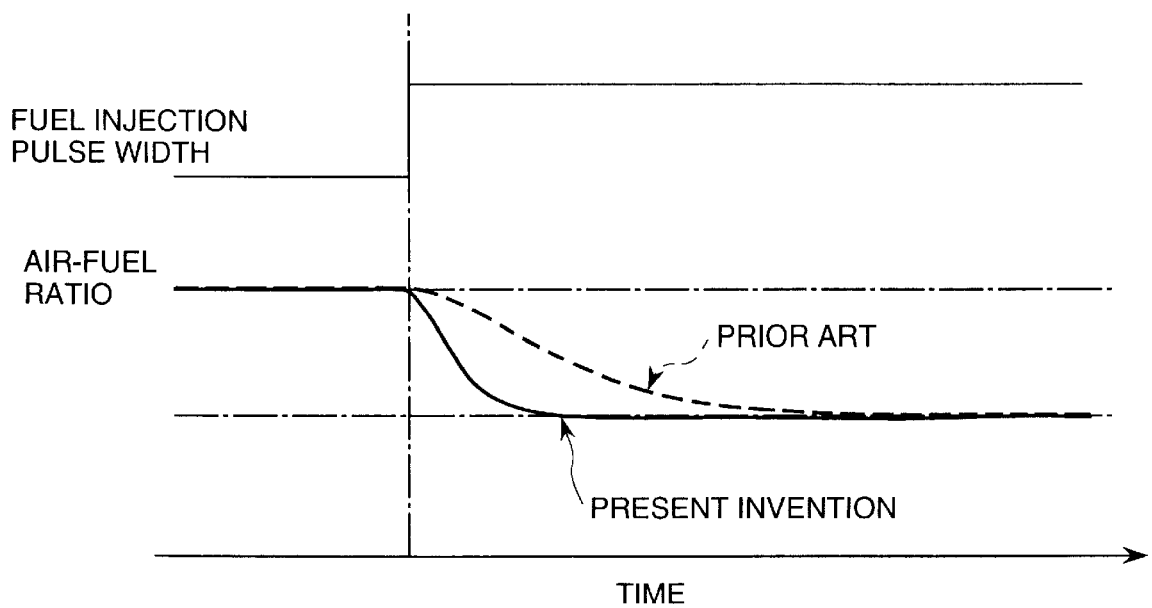
FIG. 12 illustrates a comparison between the fuel injection device of FIG. 1 and a fuel injection device according to the prior art, with respect to response of air-to-fuel ratio.
Figure 17:
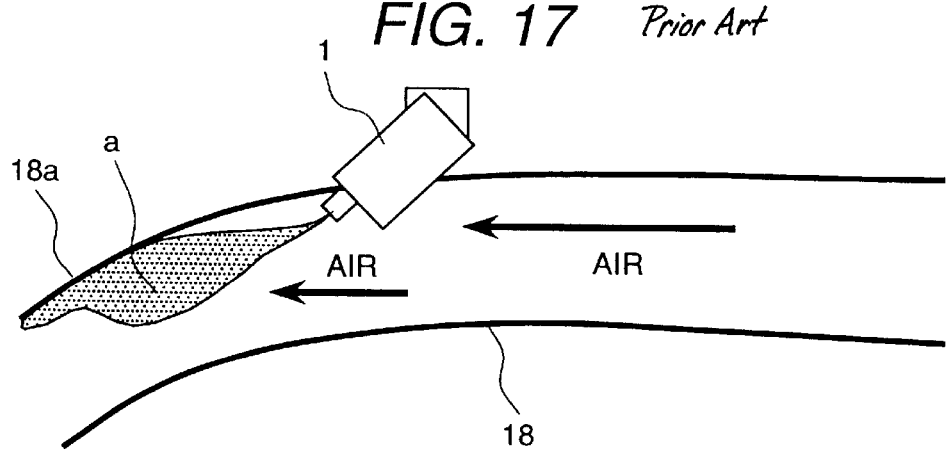
FIG. 17 illustrates the flow of air and fuel spray injected from the injector in another fuel injection device according to the prior art.

FIG. 12 illustrates a comparison between the fuel injection device according to the present invention and the fuel injection device according to the prior art (See FIGS. 17 and 18) with respect to the change of air-to-fuel ratio, namely, response of air-to-fuel ratio in the exhaust pipe 18 when the fuel injection quantity is changed stepwise under a partial load which is a representative point in the LA-4 mode.

As shown in FIG. 12, when the fuel injection quantity is changed stepwise, the air-to-fuel ratio in the fuel injection device according to the prior art changes moderately whereas the air-to-fuel ratio in the fuel injection device according to the present invention changes rapidly. This illustrates that the injected fuel is swiftly supplied into the combustion chamber of the cylinder without adhering to the wall surface of the intake pipe 18, and, as a result, the actual air-to-fuel ratio in the combustion chamber is swiftly brought to a target air-to-fuel ratio.

Figure 13:
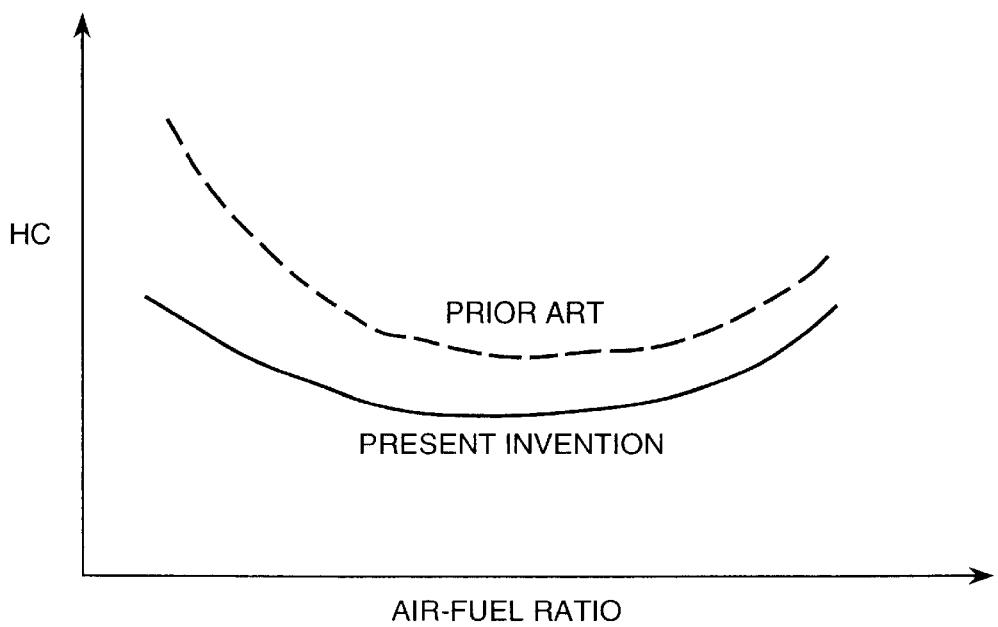
FIG. 13 illustrates a comparison between the fuel injection device of FIG. 1 and the fuel injection device according to the prior art, with respect to change of air-to-fuel ratio and the amount of HC.

FIG. 13, like FIG. 12, illustrates a determination of the condition of HC ("Hydrocarbon") in exhaust gas components when air-to-fuel ratio is changed under a partial load. It has been recognized that the fuel injection device according to the present invention can reduce the quantity of HC, as compared to the fuel injection device according to the prior art. This shows that the quality of the mixture gas in the combustion chamber of the cylinder are improved, and, as a result, combustion is improved.

Figure 14:
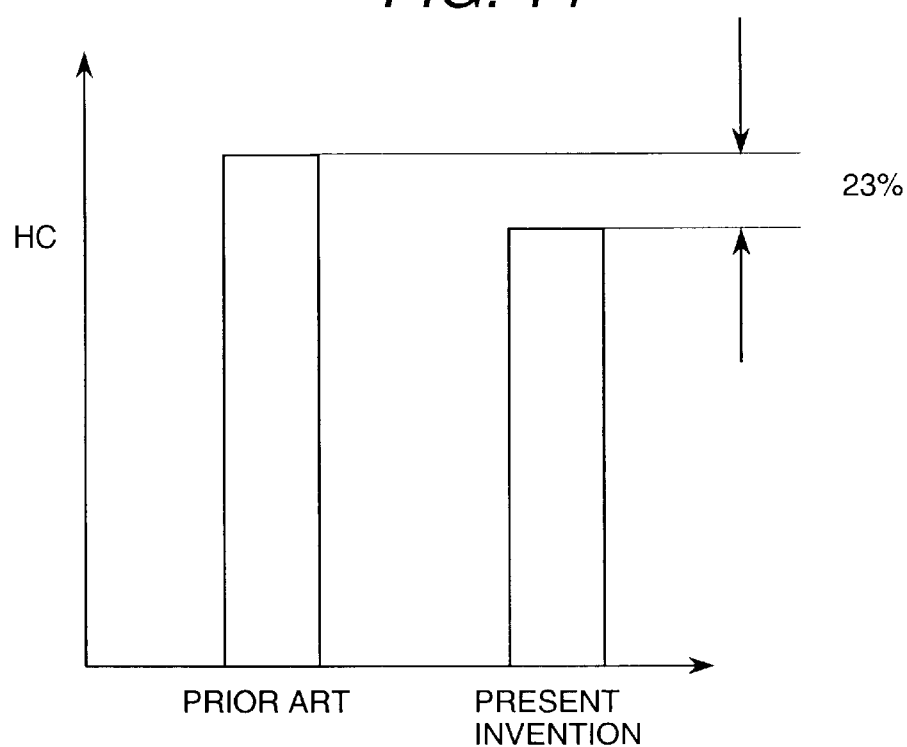
FIG. 14 illustrates a comparison between the fuel injection device of FIG. 1 and the fuel injection device according to the prior art, with respect to HC emission running in LA-4 mode.

FIG. 14 illustrates a comparison between the fuel injection device according to the present invention and the fuel injection device according to the prior art with respect to HC emission under running in the LA-4 mode. As shown, the present embodiment can reduce the HC emission by about 23%, as compared with the prior art.

Figure 15:
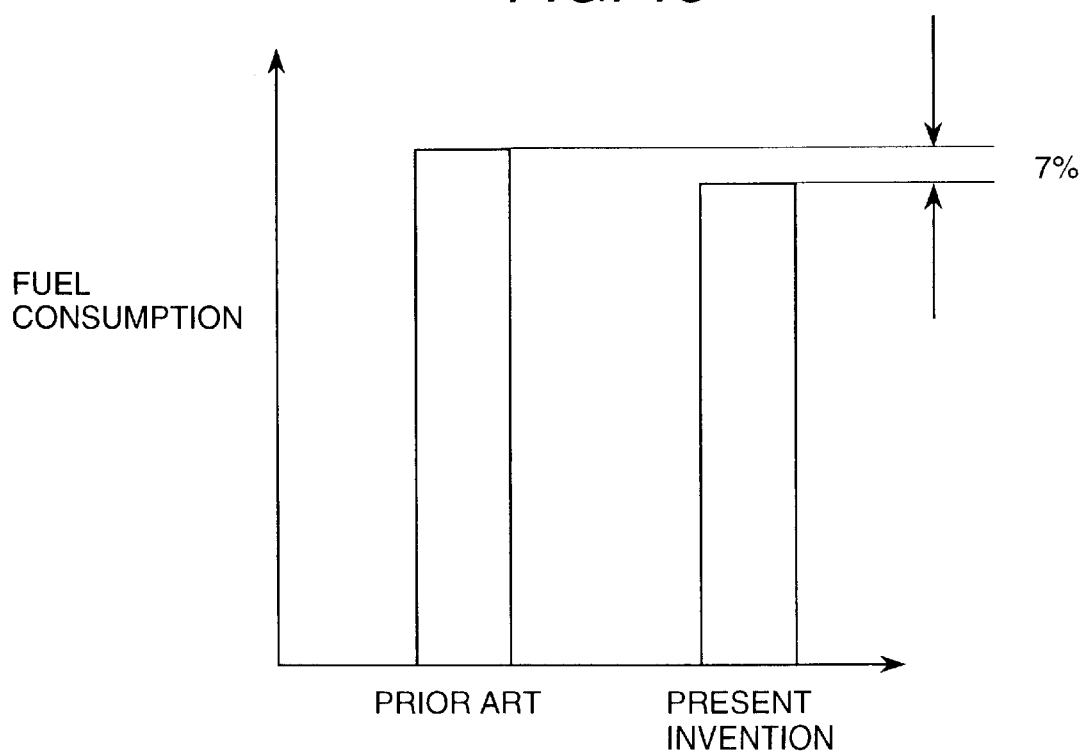
FIG. 15 illustrates a comparison between the fuel injection device of FIG. 1 and the fuel injection device according to the prior art, with respect to fuel consumption in the LA-4 mode.
Figure 16:
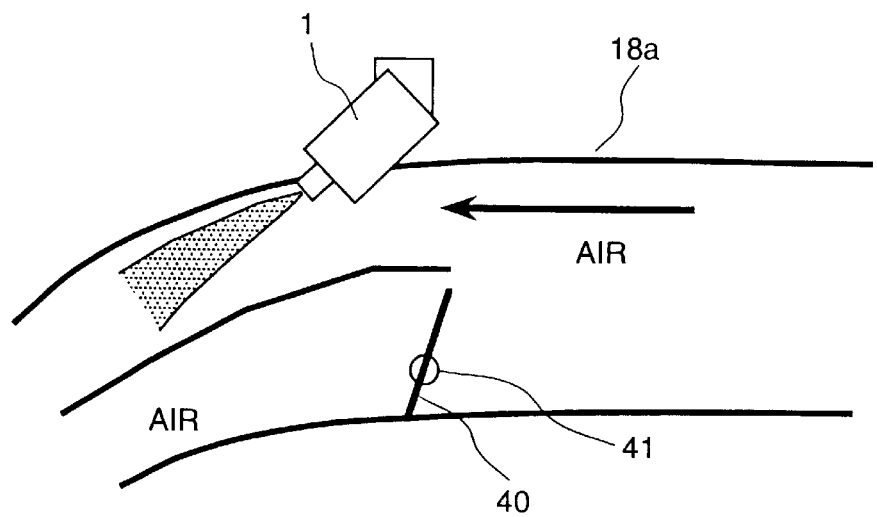
FIG. 16 illustrates the flow of air and fuel spray injected from the injector in a fuel injection device according to the prior art.

FIG. 15 illustrates a comparison between the fuel injection device according to the present invention and the fuel injection device according to the prior art with respect to fuel consumption in the LA-4 mode. It has been recognized that the present invention can reduce the fuel consumption by about 7%, as compared with the prior art.

Although the invention has been described above in connection with exemplary embodiments, it is apparent that many modifications and substitutions can be made without departing from the spirit or scope of the invention. For example, while the required fuel quantity is computed from the intake air quantity detected by the air flow sensor 2, the required fuel quantity may be calculated from the pressure in the intake pipe detected by a pressure sensor. Also, while the intake pipe 17 is constituted as a branched intake pipe having two intake ports and the injector 1 adapted for long nozzle injects the atomized fuel in two directions into the cylinder 9, an injector injecting in one direction can produce the same effect as above. Further, while the injector 1 is disposed in the intake pipe 18 in the above description, disposition of the injector at a head of the engine may be adopted together with the above-described constitution, whereby the same effects as above can be obtained. Accordingly, the invention is not to be considered as limited by the foregoing description, but is only limited by the scope of he appended claims.

What is claimed as new and desired to be protected by Letters Patent of the United States is:

1. A fuel injection device comprising:
   an intake pipe having interior wall surfaces for providing air from an upstream side to a downstream side;
   a fuel injection port disposed in said intake pipe between said surfaces for providing fuel into said intake pipe; and an air guide member disposed in said intake pipe in a plane substantially parallel to said surfaces for guiding air separately towards an air flow layer passage and a main air passage wherein said air guided towards said air flow layer passage has a speed at least greater than said air guided towards said main air passage, wherein said fuel injection port is provided in said main air passage.

2. The device of claim 1 wherein said air flow layer passage on said upstream side has a greater cross sectional area than said air flow layer passage on said downstream side.

3. The device of claim 1 further comprising an air quantity control valve disposed in said main air passage.

4. The device of claim 1 wherein said air flow layer passage is a bypass pipe bypassing said intake pipe.

5. The device of claim 4 wherein said bypass pipe bypasses a throttle valve disposed in said intake pipe.

6. The device of claim 4 further comprising an air flow layer control valve disposed in said bypass pipe.

7. An engine system comprising:

an engine control unit;

a fuel injection device electrically coupled to said engine control unit for regulating fuel injection, said device comprising:

an intake pipe having interior wall surfaces for providing air from an upstream side to a downstream side;

a fuel injection port disposed in said intake pipe between said surfaces for providing fuel into said intake pipe; and an air guide member disposed in said intake pipe in a plane substantially parallel to said surfaces for guiding air separately towards an air flow layer passage and a main air passage wherein said air guided towards said air flow layer passage has a speed at least greater than said air guided towards said main air passage, wherein said fuel injection port is provided in said main air passage.

8. The engine of claim 7 wherein said air flow layer passage on said upstream side has a greater cross sectional area than said air flow layer passage on said downstream side.

9. The engine of claim 7 further comprising an air quantity control valve disposed in said main air passage.

10. The engine of claim 7 wherein said air flow layer passage is a bypass pipe bypassing said intake pipe.

11. The engine of claim 10 wherein said bypass pipe bypasses a throttle valve disposed in said intake pipe.

12. The engine of claim 10 further comprising an air flow layer control valve disposed in said bypass pipe.

* * * * *